United States Patent [19]
Hudson

[11] 4,083,625
[45] Apr. 11, 1978

[54] OPTICAL FIBER JUNCTION DEVICE

[75] Inventor: Marshall C. Hudson, Corning, N.Y.

[73] Assignee: Corning Glass Works, Corning, N.Y.

[21] Appl. No.: 711,103

[22] Filed: Aug. 2, 1976

[51] Int. Cl.² ............................................. G02B 5/14
[52] U.S. Cl. ............................... 350/96.15; 65/4 A;
156/158; 264/248
[58] Field of Search .................. 350/96 C, 96 WG;
156/158; 264/1, 248, 249; 65/4 R, 4 A

[56] References Cited

U.S. PATENT DOCUMENTS

| | | | |
|---|---|---|---|
| 3,756,688 | 9/1973 | Hudson et al. | 350/96 C |
| 3,928,102 | 12/1975 | Rowe et al. | 350/96 C |
| 4,008,061 | 2/1977 | Ramsay | 350/96 C |

FOREIGN PATENT DOCUMENTS 2,340,020  2/1975  Germany ......................... 350/96 C Primary Examiner—John K. Corbin
Assistant Examiner—Stewart Levy
Attorney, Agent, or Firm—William J. Simmons, Jr.; Walter S. Zebrowski; Clarence R. Patty, Jr.

[57] ABSTRACT

An optical fiber junction device for permanently coupling a pair of optical fibers with a third optical fiber. The end portions of the pair of fibers are fused together in side-by-side relationship so that their endfaces are coplanar, the cross-sectional area of this structure decreasing toward the endfaces of the pair of fibers. The endface of the third fiber is fused to the endfaces of the pair of fibers.

13 Claims, 7 Drawing Figures

OPTICAL FIBER JUNCTION DEVICE

BACKGROUND OF THE INVENTION

This invention relates to optical junction devices for joining optical fibers, and it is primarily concerned with the dividing and/or combining of light propagating in optical fibers for effecting a distribution of light between a number of discrete paths or collection of light from multiple paths into a single path.

Optical waveguides, which are a promising transmission medium for optical communications systems, normally consist of an optical fiber having a core of transparent material having a refractive index $n_1$ surrounded by a layer of transparent cladding material having a refractive index $n_2$ which is lower than $n_1$. Although the theory of optical waveguides has been known for some time, practical optical waveguides that do not absorb an excessive amount of transmitted light have been developed only recently. For example, U.S. Pat. No. 3,659,915 issued to R. D. Maurer et al. discloses a low loss optical waveguide comprising a cladding layer of fused silica and a core of fused silica doped with one or more materials that selectively increase the index of refraction of the core above that of the cladding. Other known optical waveguide structures include multiclad fibers and fibers having a gradient refractive index.

In optical communication systems using optical waveguides there are many occasions when it is useful to distribute the optical signal propagating in a single waveguide into two or more waveguides. Conversely, there are occasions when optical signals propagating in two or more waveguides need to be coupled into a single waveguide. In accordance with a further extension of this concept, the optical signals propagating in two or more waveguides can be mixed, the composite signal being coupled into two or more additional waveguides.

Optical junction devices are known wherein at least one optical fiber is coupled to a plurality of optical fibers, a few of such devices having been disclosed in U.S. Pat. Nos. 3,455,625 issued to C. H. Brumley et al., 3,453,036 issued to C. H. Swope et al., 3,870,396 issued to J. G. Racki et al., 3,870,398 issued to R. E. Love, and 3,901,581 issued to F. L. Thiel. In junction devices such as these light is coupled through a transparent medium, thus introducing Fresnel losses at the fiber-medium interfaces.

SUMMARY OF THE INVENTION

It is therefore an object of the present invention to provide an optical fiber junction device which overcomes the disadvantages of the prior art.

Another object is to provide an optical fiber junction device which is suitable for use in optical communication systems employing single fiber channels.

Another object is to provide an optical fiber junction device having low insertion loss.

Briefly, this invention relates to a junction device for optical fibers having a core of transparent material surrounded by a layer of transparent cladding material having a refractive index lower than that of the core. The junction device comprises at least two optical fibers having their end portions fused together in parallel side-by-side relationship, the endfaces thereof being substantially coplanar and the cross-sectional area of these end portions decreasing toward the endfaces. At least one other fiber is so disposed with respect to the two optical fibers that its end portion is parallel to the end portions of the two optical fibers and its endface is fused to the endfaces of the two optical fibers.

DETAILED DESCRIPTION

Figure 1:
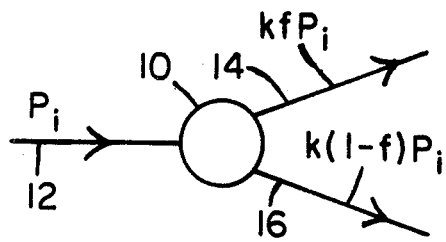
FIG. 1 is a schematic diagram of the optical junction device of the present invention.

A schematic diagram of the optical junction device of the present invention is shown in FIG. 1. Junction device 10 couples fiber 12 to fibers 14 and 16. This schematic diagram is used to illustrate the coupling of light from the first fiber to the pair of fibers, it being apparent that light from the pair of fibers 14, 16 can be coupled by the junction device to fiber 12. Input signal $P_i$ propagating in fiber 12 is divided into two parts, $fP_i$ and $(1-f)P_i$, which initiate the propagation of light in fibers 14 and 16, respectively. The signal loss which is encountered in such a device is termed insertion loss. The sum of the signals from fibers 14 and 16 divided by the input signal $P_i$ defines the fractional loss $k$, assuming that the length of the fibers is sufficiently short that the light suffers negligible transmission loss therein. Insertion loss is usually expressed in decibels by the definition, $-10 \log_{10} k$. In optical communication systems optical fiber function devices should exhibit low insertion loss, and thus, $k$ should be as close to unity as possible.

Figure 4:
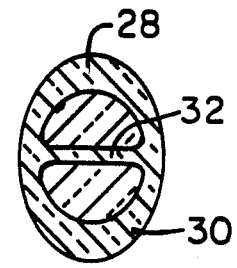
FIG. 4 is a cross-sectional view taken along lines 4—4 of FIG. 3.
Figure 2:
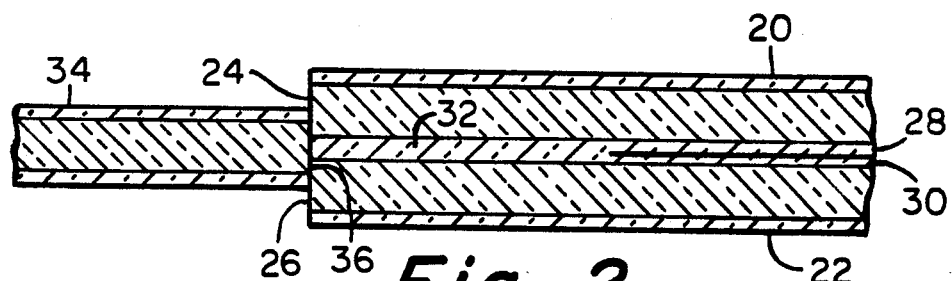
FIGS. 2 and 3 are cross-sectional views illustrating sequential steps in the formation of a first embodiment of this invention.
Figure 3:
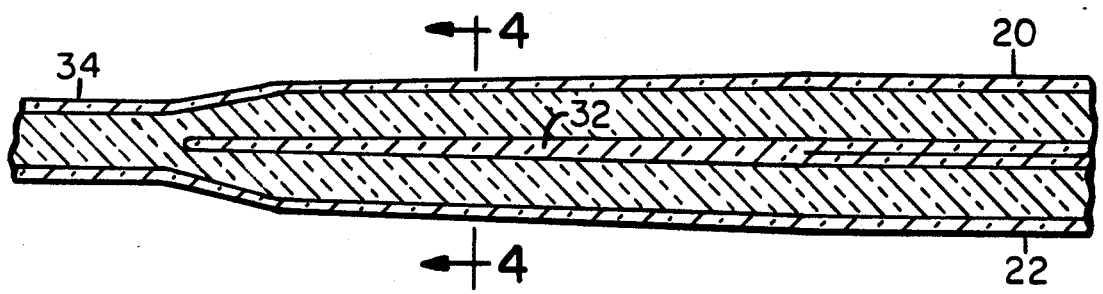

A first embodiment of the present invention can be formed in accordance with the steps illustrated in FIGS. 2 through 4. Fibers 20 and 22 are disposed in side-by-side relationship so that endfaces 24 and 26 are substantially coplanar. Heat is applied locally to the end portions of fibers 20 and 22 in an amount which is just sufficient to fuse the abutting cladding layers 28 and 30 to form the fused section 32. The axis of the end portion of fiber 34 is disposed substantially parallel to the axes of the end portions of fibers 20 and 22 with endface 36 abutting endfaces 24 and 26. To couple substantially equal amounts of power from fiber 34 to fibers 20 and 22, the core of fiber 34 is so disposed that it intercepts substantially equal areas of the cores of fibers 20 and 22. Heat is applied to the junction of the endfaces thereby completely fusing endface 36 with endfaces 24 and 26. Finally, heat is applied to fibers 20 and 22 in the vicinity of fused cladding 32 and the fused endfaces while fibers 20 and 22 are pulled away from fiber 34 to elongate the end portions of fibers 20 and 22 as illustrated in FIG. 3.

An important consideration in making good low loss splices between optical fibers is the quality of the fiber endfaces, a clean and relatively flat endface being preferred. The fiber endfaces may be ground and polished, or it may be sufficient to merely break the fibers by well known techniques. For example, the fiber endfaces may be prepared by scoring, stressing and bending as discussed by E. L. Chinnock et al. in their publication entitled "Optical Fiber End Preparation for Low-Loss Tape Splices", Bell System Technical Journal, Vol. 54, March 1975, pp. 471–477. Prior to preparing the end portions of the fibers, any coating thereon may be removed. Conventional plastic coatings, which are applied to fibers to improve their strength, may be removed by dipping the end portions of the fibers into acetone.

Any well known technique may be employed to supply a source of localized heat to effect fusion of the end portions of fibers 20 and 22 and fusion of endface 26 to endfaces 24 and 26. For example, an electrical discharge provided by an apparatus such as that disclosed in U.S. Pat. No. 3,960,531 issued June 1, 1976 to Y. Kohanzadeh et al. may be employed. Alternatively, a miniature oxy-butane torch may be employed to provide the localized heating required to effect fusion of the fibers. The use of such controllable, localized heat sources has been effective in producing couplers having low insertion loss.

The controllable intensity and local positioning of the heat source permits the fused area to be "worked" as a lampworker might work glass tubing or rods in a flame. By viewing the work area through a microscope and moving the fibers or the heat source by means of micropositioners, the fused area can be made to taper and extend some distance along fibers 20 and 22. Careful tapering has been shown to decrease the insertion loss below the value which would be expected by calculation of end-to-end losses. When one fiber with an 85 $\mu$m core diameter and a 20 $\mu$m cladding thickness was fused to two other fibers with the same dimensions, an insertion loss of less than 0.5 dB was incurred, approximately one-half the power from the input fiber propagating in each of the two output fibers. This compares with a predicted loss of 3.74 dB. In this embodiment the length of the tapered region, in which the cladding layers of fibers 20 and 22 are fused together, was about ten times the original diameter of the fibers. If the ratio of the length of the tapered region to the fiber diameter becomes much smaller than 10 to 1, the abruptness of the transition region between fiber 34 and fibers 20 and 22 will cause an intolerable increase in insertion loss.

The cross-sectional view of FIG. 4 is taken about midway along the tapered region of fibers 20 and 22. This figure illustrates the manner in which the cores of fibers 20 and 22 have approached each other, common wall 32 of cladding material having a thickness of approximately 12 $\mu$m remaining between them in this region.

The insertion loss of the optical junction device of FIGS. 2-4 can be lowered by etching some or all of the cladding from the end portions of fibers 20 and 22 so that the ratio of the core radius to the cladding thickness is greater at the end portions of the fibers than at the remainder of the fibers. This can be accomplished in the manner described in U.S. Pat. No. 3,912,362 issued to me on Oct. 14, 1975. It can be seen that the core of fiber 34 will encompass a greater area of the cores of fibers 20 and 22 when the cladding of these latter mentioned fibers is reduced in thickness. It is noted that the end portion of fiber 34 need not be etched since no reduction in insertion loss is achieved thereby.

A device of the type illustrated in FIGS. 3 and 4 can also be made by forming a tapered transition region in fibers 20 and 22 prior to fusing their endfaces to endface 36. Fiber 20 and 22 are initially fused together as described hereinabove. A dummy rod or fiber is then attached to the fiber endfaces to facilitate the pulling and elongation of these fibers while heat is applied to the end portions thereof. The composite fiber formed by the side-by-side fusion and subsequent elongation of the two fibers if broken in the manner described hereinabove at the desired location along the tapered region. The endface so formed is fused to endface 36. The tapered region may thereafter be heated and pulled to create a longer or narrower transition region if so desired.

Figure 5:
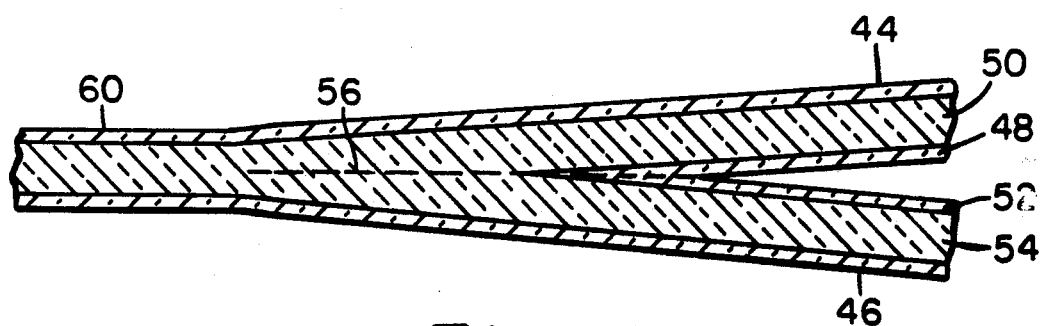
FIG. 5 is a cross-sectional view of another embodiment of the present invention.

The packing fraction loss, i.e., the amount of cladding from the pair of fibers intercepted by the core of the other fiber, can be reduced by grinding away one side of the pair of fibers as illustrated in FIG. 5. In this embodiment a portion of the core and cladding is removed from the end portions of fibers 44 and 46. At the endfaces of these two fibers only one half of each fiber remains so that the end portions of cores 50 and 54 and of cladding layers 48 and 52 combine to form a single circular endface. Fibers 44 and 46 are ground at an angle so that the fiber cores remain fully clad a distance of about one centimeter from the endfaces thereof. To reduce surface contamination or surface roughness, which can cause bubbles to appear in the fused region defined by dashed line 56, the fibers should be ground, etched and cleaned before they are fused together. Otherwise, the method of forming the junction device of FIG. 5 is similar to that described in conjunction with FIGS. 2-4. After the end portions of fibers 44 and 46 are fused together, the endface of fiber 60 is fused to the common endface of fibers 44 and 46.

Figure 6:
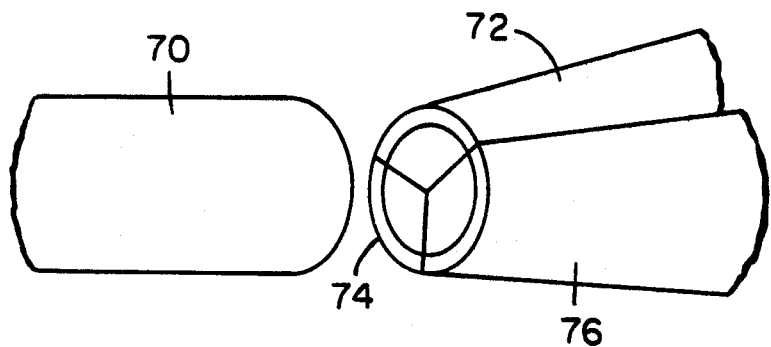
FIGS. 6 and 7 are oblique views of still further embodiments of this invention.
Figure 7:
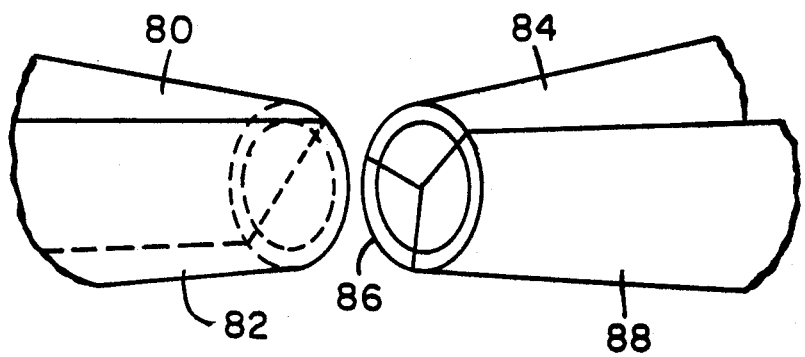

FIGS. 6 and 7 illustrate other embodiments wherein the end portions of a plurality of fibers are tapered and fused together to form a common endface. In FIG. 6 the endface of a single fiber 70 is disposed adjacent to the common endface formed by the tapered portions of fibers 72, 74 and 76. In FIG. 7 the end portions of fibers 80 and 82 are tapered and fused together to form a common circular endface while fibers 84, 86 and 88 are tapered and fused together to form a second common endface which can be joined by fusion to the endface of fibers 80 and 82. This method can be extended to other similar configurations with differing numbers of fibers and differing coupling ratios.

I claim:

1. A junction device for optical fibers having a core of transparent material surrounded by a layer of transparent cladding material having a refractive index lower than that of said core material, said device comprising
   at least two optical fibers having their end portions fused together in side-by-side relationship, the cross-sectional area of said end portions decreasing toward the endfaces of said fibers, and
   at least one other fiber having its end portion disposed parallel to the end portions of said at least two fibers, the endface of said at least one other fiber being fused to the endface of said at least two optical fibers, and the core of said at least one other fiber overlapping at least a portion of the cores of said at least two fibers.

2. A junction device in accordance with claim 1 wherein the ratio of the core radius to the cladding thickness is greater at the end portions of said at least two fibers than at the remainder thereof.

3. A junction device in accordance with claim 1 wherein the end portions of each of said at least two fibers comprises a core completely surrounded by cladding material, the portions of said at least two fibers which are fused together consisting of a common wall of cladding material having a thickness less than the thickness of the cladding layer in the remainder of said fibers, the cores of said end portions being asymmetrical in cross section.

4. A junction device in accordance with claim 1 wherein the diameter of the core of each of said fibers is greater than the thickness of the cladding layer thereof.

5. A junction device in accordance with claim 1 wherein the end portions of said at least two optical fibers are free from cladding material in at least a portion of the region where said fibers are fused together so that the cores of said at least two fibers are fused to form a common core that is surrounded by cladding material.

6. A junction device in accordance with claim 5 wherein said at least one other fiber comprises a plurality of fibers having their end portions fused together in side-by-side relationship, the endfaces of said plurality of fibers being fused to the endfaces of said at least two fibers.

7. A method of forming a junction between at least two optical fibers and at least one other optical fiber, said optical fibers having a core of transparent material surrounded by a layer of transparent cladding material having a refractive index lower than that of said core material, said method comprising fusing together the end portions of said at least two optical fibers in side-by-side relationship to form a unitary, multi-cored structure having a single cladding layer, the cores of said unitary structure being asymmetrical in cross section, fusing the endfaces of said at least two fibers to the endface of said, at least one other fiber, and heating the fused end portions of said at least two fibers while applying a force thereto which causes said at least two fibers to become elongated and tapered in such a manner that the cross-sectional area of the end of said fused fibers approaches that of said at least one other fiber.

8. A method in accordance with claim 7 wherein, prior to the step of fusing together the end portions of said at least two fibers, at least a portion of the cladding material is etched therefrom.

9. A method in accordance with claim 7 wherein the steps of fusing together the end portions and heating the fused end portions are performed prior to the step of fusing the endface of said at least two fibers to the endface of said at least one other fiber, said method further comprising the step of breaking said at least two fibers in the tapered region thereof prior to fusing the endfaces of said at least two fibers to the endface of said at least one other fiber.

10. A method in accordance with claim 7 wherein, prior to the step of fusing together the end portions of said at least two fibers, the cladding and a portion of the core is removed from each of said at least two fibers in the region where said at least two fibers are to be fused together.

11. A junction device for optical fibers having a core of transparent material surrounded by a layer of transparent cladding material having a refractive index lower than that of said core material, said device comprising at least two optical fibers having their end portions fused together in side-by-side relationship, the cross-sectional area of said end portions decreasing toward the endfaces of said fibers, the cores of said end portions being asymmetrical in cross section, and at least a part of the fused end portions of said at least two fibers consisting of a common wall of cladding material having a thickness less than the thickness of the cladding layer in the remainder of said fibers, and at least one other fiber having its end portion disposed parallel to the end portions of said at least two fibers, the endface of said at least one other fiber being fused to the endface of said at least two optical fibers, said fibers substantially constituting the sole energy propagating medium in said device.

12. A junction device in accordance with claim 11 wherein the end portions of said at least two optical fibers are free from cladding material in at least a portion of the region where said fibers are fused together so that the cores of said at least two fibers are fused to form a common core that is surrounded by cladding material.

13. A junction device in accordance with claim 12 wherein said at least one other fiber comprises a plurality of fibers having their end portions fused together in side-by-side relationship, the endfaces of said plurality of fibers being fused to the endfaces of said at least two fibers.

* * * * *